(12) United States Patent
Zhang et al.

(10) Patent No.: US 10,366,497 B2
(45) Date of Patent: Jul. 30, 2019

(54) IMAGE/VIDEO EDITOR WITH AUTOMATIC OCCLUSION DETECTION AND CROPPING

(71) Applicant: Apple Inc., Cupertino, CA (US)

(72) Inventors: Ke Zhang, San Jose, CA (US); Jiefu Zhai, San Jose, CA (US); Yunfei Zheng, Cupertino, CA (US); Shujie Liu, Cupertino, CA (US); Albert E. Keinath, Sunnyvale, CA (US); Xiaosong Zhou, Campbell, CA (US); Chris Y. Chung, Sunnyvale, CA (US); Hsi-Jung Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/618,967

(22) Filed: Jun. 9, 2017

(65) Prior Publication Data

US 2017/0358059 A1    Dec. 14, 2017

Related U.S. Application Data

(60) Provisional application No. 62/348,604, filed on Jun. 10, 2016.

(51) Int. Cl.
| | |
|---|---|
| *G06T 5/00* | (2006.01) |
| *G06T 7/194* | (2017.01) |
| *G06T 7/11* | (2017.01) |
| *G11B 27/031* | (2006.01) |

(52) U.S. Cl.
CPC ............... *G06T 7/194* (2017.01); *G06T 7/11* (2017.01); *G11B 27/031* (2013.01); *G06T 2207/20132* (2013.01)

(58) Field of Classification Search
CPC .......... G06T 7/194; G06T 7/11; G11B 27/031
See application file for complete search history.

(56) References Cited

U.S. PATENT DOCUMENTS

| 8,477,246 | B2 | 7/2013 | Saxena et al. |
| 8,755,837 | B2 | 6/2014 | Rhoads et al. |
| 9,191,580 | B2 | 11/2015 | Venkataraman et al. |
| 2002/0063807 | A1 | 5/2002 | Margulis |
| 2005/0093891 | A1* | 5/2005 | Cooper .................. G03B 17/18 345/649 |
| 2010/0329588 | A1* | 12/2010 | Cheatle .............. G06K 9/00234 382/298 |
| 2014/0079297 | A1* | 3/2014 | Tadayon .................. G06K 9/00 382/118 |
| 2017/0345196 | A1* | 11/2017 | Tanaka ...................... G06T 5/50 |

OTHER PUBLICATIONS

Nielsen et al, "Autoframing: A Recommendation System for Detecting Undesirable Elements and Cropping Automatically Photos", 2006, In Multimedia and Expo, 2006 IEEE International Conference on, pp. 417-420 (Year: 2006).*

* cited by examiner

*Primary Examiner* — David F Dunphy
(74) *Attorney, Agent, or Firm* — BakerHostetler

(57) ABSTRACT

Techniques for cropping images containing an occlusion are presented. A method for image editing is presented comprising, when an occlusion is detected in an original digital image, determining an area occupied by the occlusion, assigning importance scores to different content elements of the original digital image, defining a cropping window around an area of the original digital image that does not include the area occupied by the occlusion and that is based on the importance scores, and cropping the original digital image to the cropping window.

19 Claims, 4 Drawing Sheets

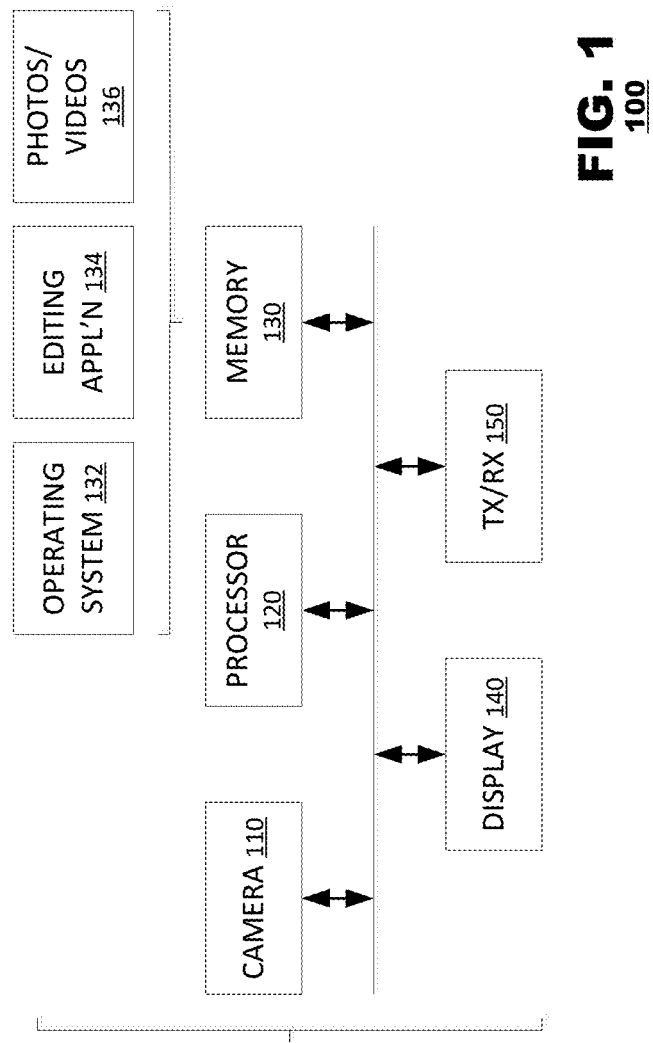
FIG. 1
100

200

400

IMAGE/VIDEO EDITOR WITH AUTOMATIC OCCLUSION DETECTION AND CROPPING

CROSS REFERENCE TO RELATED APPLICATIONS

This application claims benefit of Provisional U.S. Patent Application No. 62/348,604, entitled "Image/Video Editor with Automatic Occlusion Detection and Cropping" and filed Jun. 10, 2016, the contents of which is incorporated herein by reference in its entirety.

BACKGROUND

The present disclosure relates to video editing algorithms.

Many modern consumer electronic devices come equipped with digital camera systems that allow users of those devices to capture digital images and video (collectively, "image data"). Such devices often are packaged in relatively small form factor housings, which increases the likelihood that operators' will occlude the optical path between the camera system and the intended subject of the image/video. Thus, operator fingers, clothing and other objects may be captured as part of the image data accidentally.

The inventors perceive a need in the art for an automatic editing system that detects occlusions and crops such occlusions from image data.

BRIEF DESCRIPTION OF THE DRAWINGS

FIG. 1 is a simplified block diagram of an editing system according to an embodiment of the present disclosure.

DETAILED DESCRIPTION

Figure 2:
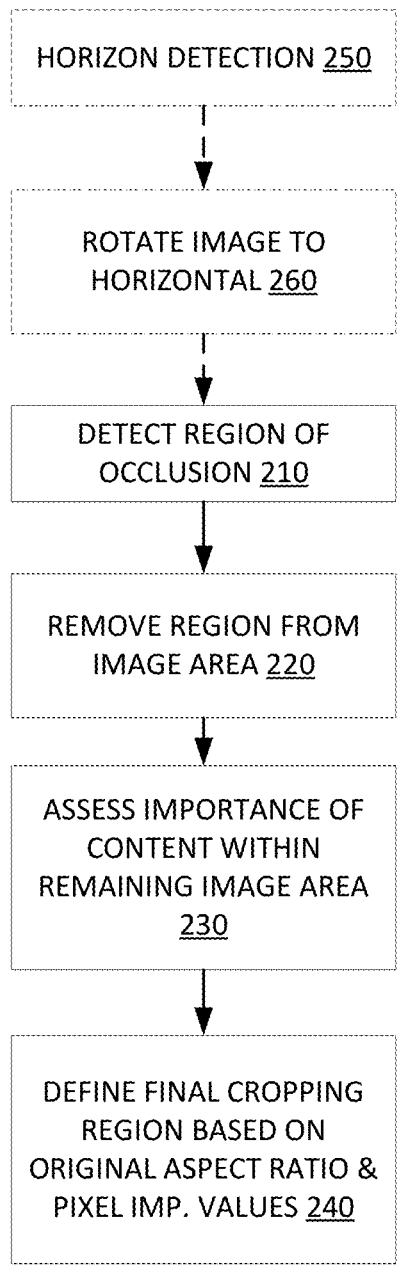
FIG. 2 illustrates a method according to an embodiment of the present disclosure.

An automated image editor detects an occlusion in image data and redefines the image area to remove a region occupied by the image data from the image area. The editor may estimate the visual importance of content in the remaining image area, then define a cropping window that maximizes the average importance of the image and preserves aspect ratio as compared to the source image.

FIG. 1 is a simplified block diagram of an editing system 100 according to an embodiment of the present disclosure. The system 100 may include: a camera 110 system that captures digital image data representing local image data; a processor 120 that executes program instructions and operates on image data as described herein; and a memory system 130. The memory system 130 may store program instructions that define an operating system 132 and application(s) of the system 100, such as an image or video editing application 134, and may also store data representing digital image data, such as photo and video data 136, on which the techniques described herein are performed. System 100 may also include a display 140 for displaying image data, and optionally, a transceiver 150 for exchanging image data with other devices (not shown).

The processor 120 may execute program instructions that define an editing application 134 that can perform cropping operations on image data. The editing application 134 may perform occlusion detection processes on image data, which identifies region(s) within a field of view that likely contain image information of an occluding object, and then crops the image data to remove the regions with occlusions from the image. Cropping image data may include, for example, copying image data that is within a cropping region to create a new cropped image without copying the image data outside the cropping region. The editing application 134 may operate on image data as it is output by the camera 110 or, alternatively, may operate on image data that is stored in the memory 130. Cropped image data may be stored in the memory 130.

FIG. 2 illustrates a method 200 according to an embodiment of the present disclosure. The method 200 may begin by identifying a region of an occlusion in the image data (box 210). If the image data contains an occlusion, the method may redefine boundaries of the image area to remove the region therefrom (box 220). The method 200 then may assess importance of content within the remaining image area (box 230). The method 200 may define a cropping region for the image such as to meet, maximize, or balance one or more constraints (box 240). For example a cropping region may be chosen that matches an aspect ratio of the original image and also maximizes the average value of importance assigned to image content in the cropping window. A cropping region may also be chosen to maintain the proportional location of a detected vanishing point or proportional location of a region of interest.

Figure 3:
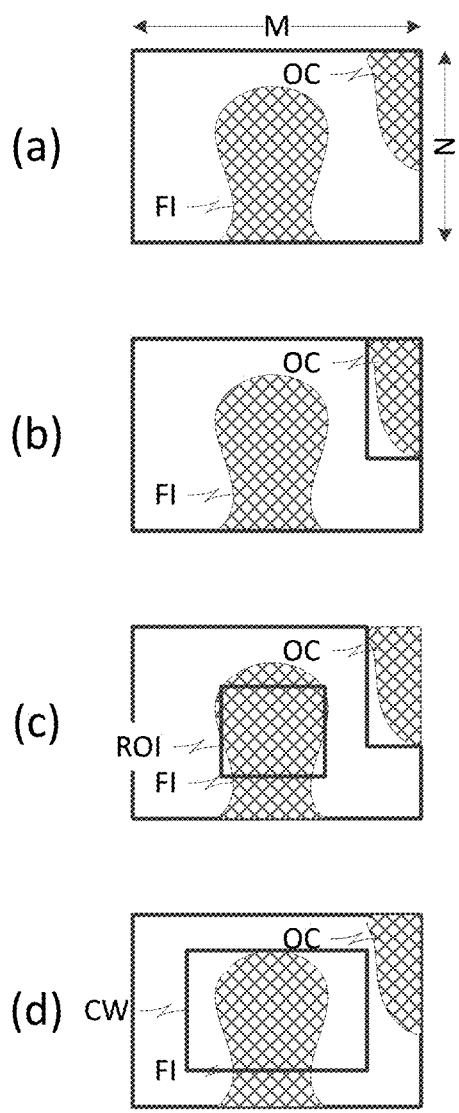
FIGS. 3(a), 3(b), 3(c) and 3(d) illustrate an application of an embodiment to exemplary image data.

FIGS. 3(a)-3(d) illustrate an application of an embodiment, such as method 200, to exemplary image data 300. FIG. 3(a) illustrates a source image having an aspect ratio of M×N pixels, which includes image data both of a foreground image (FI) and an occlusion (OC). FIG. 3(b) illustrates the image area having been altered with redefined image boundaries to remove a region occupied by the occlusion (OC). FIG. 3(c) illustrates a region of the image data in which an ROI is detected. FIG. 3(d) illustrates identification of a final cropping window (CW) for the image.

Occlusions may be detected, for example, based on motion, blurriness, location within the image frame, and brightness. Motion as indicated in motion sensor data or image motion estimates may indicate an occlusion. An image capture device may possess a motion sensor (accelerometer/gyroscopic sensor) that produces data representing movement of the device during image capture. Such motion sensor data may be stored as metadata associated with the captured image data. Additionally, a capture device or an image editing device may estimate motion of image content within a sequence of captured image(s)—for example an image captured in response to user command and preview/postview images that were captured in temporally adjacent positions. Motion estimates of image content may be compared to data of the motion sensor, and occlusions may be identified from this comparison. For example, a finger over the camera aperture likely will have little or no motion in image content of the finger, while the remainder of the image content may have motion caused by operator shake. An occlusion will move with the camera, while other image data will not. A region of image data where motion estimates based image data do not correlate to camera motion sensor data may be a candidate occlusion region.

An occlusion may also be detected based estimates of degrees of blurriness. Occlusions tend to be out of the focus depth of the camera that captures them. An image capture or editing device may estimate degrees of focus, degrees of blurriness, and/or a lack of texture or sharp edges. These estimates may be made for different regions of a captured image. Such estimates may to identify an occlusion.

Location of an object within a captured image may indicate an object is not an occlusion. Occlusions tend to present themselves at the periphery of image data. So, areas of content located at the center of an image (or areas that are considered in focus) may be disqualified from being considered as occlusions.

Brightness differences, either between two regions of an image, or between a sensor measurement and a region of an image, may indicate an occlusion. Occlusions generated by close-in objects (such as fingers covering a portion of the capture aperture) may have brightness characteristics that differ from other image content. Cameras typically include brightness sensors (photodiodes that are separate from the image sensor) to measure ambient brightness of the environment (and also its type—sunlight vs. synthetic light). The occluding object may have characteristics that differ from "ordinary" image content because it often is so close to the camera that it is obscure from ambient light sources. For example, by pressing a finger over a portion of a camera lens, the finger is in shadow.

Occlusions may be detected based on a second camera, such as in a dual camera system or where the second camera is a depth camera. Data from a depth camera may be used to detect an occlusion, for example by interpreting object with a small depth value (small distance from the camera) to be occluding objects. A dual camera system may be used to detect occlusion, for example, by constructing a depth map from stereo camera images, and then interpreting object with a small depth value as an occlusion. An occlusion may also be determined in a multiple camera system by identifying an object that does not occur in images captured from all objects. For example, a finger partially covering the aperture of one camera, but not other camera may be identified as an occlusion.

Importance scores may be assigned to image region content in a variety of ways. For example, image data may be analyzed to identify regions of interest (ROI) within the image data, such as human faces or other predetermined foreground objects; the ROI regions would be given higher importance scores than non-ROI (non-region of interest) data. Importance scores also may be assigned based on foreground/background discrimination processes, where foreground data is assigned higher importance scores than background data. Further, importance scores may be assigned based on motion estimation of objects within image data; if for example, some objects have motion that deviates from a general direction of motion of the image data; those objects may be assigned higher importance scores than other image content where such motion does not appear. In an embodiment, importance scores may be assigned to image data on a pixel-by-pixel basis. FIG. 3(d) illustrates identification of a final cropping window (CW) for the image. In this example, the cropping window (CW) is rectangular and has the same aspect ratio as the source image (e.g., it is proportional to the M×N dimensions of the source image) and includes the entire identified region of interest ROI. The method 200 may test cropping windows at a variety of locations within the redefined image area, using a variety of window sizes in order to find a cropping window (CW) having the largest importance score. For example, when a cropping window does not include all of a region of interest or does not include each of a plurality of identified regions of interest, the importance score for that cropping window may be lower than a cropping window that includes the entirety of the region of interest or include all identified regions of interest, respectively. An importance score associated with a particular candidate cropping window may be an aggregate or average of all importance scores of content elements (individual pixels or regions of pixels) contained within the candidate cropping window.

The principles of the present disclosure may be extended to accommodate additional functionality. For example, the method 200 may perform image analysis to identify a horizon in the image data (box 250) and may rotate image content within the image window to align the detected horizon with a horizontal axis in the image area. Such techniques may improve the visual quality of resultant image data. Horizon detection and rotation may occur before occlusion detection and removal (as depicted in FIG. 2), or after. However, detecting and rotating a horizon may be advantageously done first for multiple reasons. First, horizon detection may be more accurate before cropping since more image data may be used to detect the horizon. Second, a larger final cropping region may be found in box 240 when horizon rotation occurs before the final cropping window is defined and rotation is done without cropping (such that new areas of an image are created that do not correspond to data in the original image).

Figure 4:
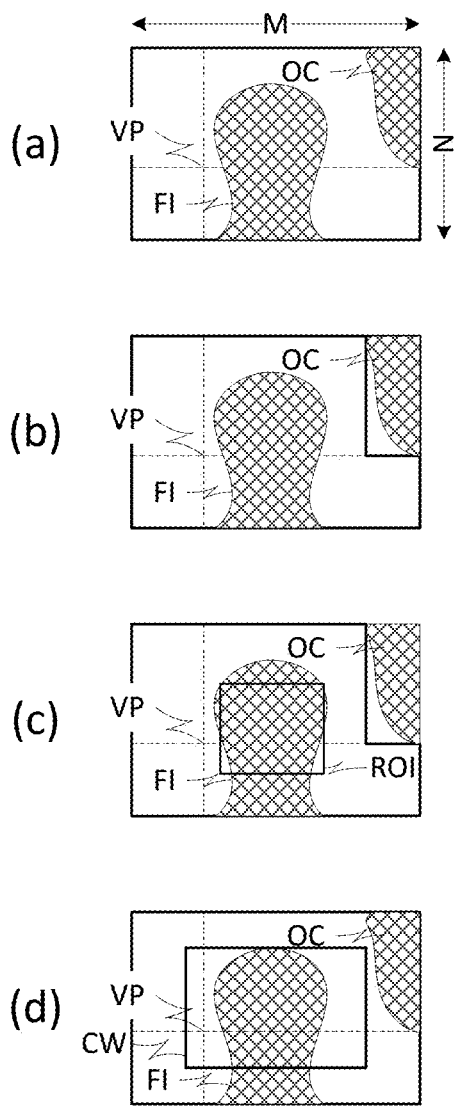
FIGS. 4(a), 4(b), 4(c) and 4(d) illustrate an alternate application of an embodiment to exemplary image data.

Additionally, the method 200 may identify a vanishing point within image data and use a detected location of the vanishing point as a basis for defining a cropping window (step not shown). In some embodiment, an importance score may be assigned to a content element (such as a region of pixels or on a pixel-by-pixel basis) based on a distance of the content element from the detected location of the vanishing point. FIG. 4(a) illustrates an image with an exemplary detected vanishing point (VP).

FIGS. 4(a)-4(d) illustrate an alternate application of an embodiment, such as method 200 of FIG. 2, to exemplary image data. In FIG. 4(a), an original image of M×N pixel resolution dimensions contains a non-rectangular foreground image (FI), detected occlusion (OC) (box 210), and vanishing point (VP). FIG. 4(b) depicts redefined boundaries of the image (thicker line) that may eliminate a detected occlusion (OC) (box 220). In FIG. 4(c), image analysis may assess the importance of content within the remaining image areas (box 230) and a rectangular region of interest ROI may be defined that includes some of the previously identified non-rectangular foreground image FI.

Thereafter, in FIG. 4(c), when the method 200 defines a cropping window, the method may identify a cropping window that: a) matches the aspect ratio of the source image, b) has the highest average importance score, c) maintains a consistent position of the vanishing point when compared to the source image, and d) maintains a consistent position of a region of interest when compared to the source image. The aspect ratio may be matched when the aspect ratio of the cropping windows is the same as the aspect ratio of the source image. An average importance score for a possible cropping window may be determined, for example, by averaging the importance scores for each pixel inside the cropping window where importance scores are determined on a pixel-by-pixel basis. A consistent vanishing point position may be determined by choosing cropping window where the vanishing point within the cropping window is located proportionally at the same location as the vanishing point within the original image. For example, if the vanishing point were detected to be offset ¼ from the left edge of the source image area and ⅗ from the top edge of the source image area, the method 200 may prioritize cropping windows in which the same ¼ and ⅗ offsets are maintained. As with the consistent vanishing point position, a consistent proportional position of a region of interest may also be determined.

In an embodiment, rather than selecting windows based solely on maximization of average importance, the method 400 may define cropping windows according to alternative techniques. For example, the method may maximize the size of cropping window as an objective, which may allow for a cropping window with higher aesthetic appeal. The method 400 may define a cropping window that maximizes average importance in a center of the display area but accommodates a border region around a perimeter of the cropping window which may include less important content.

Several of the objectives listed in this disclosure may compete with each other, which can occur in multi-objective optimization problems. When competition arises among different objectives, the method may resolve such competition by several methods, for instance, by assigning weights to different objectives and resolving competition in favor of the high-weighted objective.

As noted, the techniques described herein apply both to still image data and video data.

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to affect such feature, structure, or characteristic in connection with other embodiments whether or not explicitly described.

Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system, or other electronic data processing device, that manipulates and transforms data represented as physical (electronic) quantities within the system's registers and memories into other data similarly represented as physical quantities within the system memories or registers or other such information storage, transmission or display devices.

The invention also relates to apparatuses for performing the operations described herein. This apparatus may be specially constructed for the required purposes, or it may comprise a general purpose computer or other data processing system selectively activated or reconfigured by a computer program stored in the computer. Such a computer program may be stored or transmitted in a machine-readable medium, such as, but is not limited to, a machine readable storage medium (e.g., any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions).

The algorithms and displays presented herein are not inherently related to any particular computer system or other apparatus. Various general purpose systems may be used with programs in accordance with the teachings herein, or it may prove convenient to construct more specialized apparatus to perform the required method's operations. The required structure for a variety of these systems will appear from the description below. In addition, the present invention is not described with reference to any particular programming language. It will be appreciated that a variety of programming languages may be used to implement the teachings of the invention as described herein.

We claim:

1. A method for image editing, comprising:
   when an occlusion is detected in an original digital image, determining an area occupied by the occlusion;
   rotating the original digital image to align a detected horizon to a horizontal axis;
   assigning importance scores to different content elements of the rotated digital image;
   defining a cropping window around an area of the rotated digital image that does not include the area occupied by the occlusion and that is based on the importance scores; and
   cropping the rotated digital image to the cropping window.

2. The method of claim 1, wherein the original digital image was captured by a first camera, and further comprising:
   detecting the occlusion based at least in part on a data from a second camera.

3. The method of claim 1, wherein the content elements include at least one region of interest and one non-region of interest and the importance scores are different for portions of image data within the region of interest and portions of image data within the non-region of interest.

4. The method of claim 3, wherein the cropping window is sized to retain proportionality between the region of interest's relative position within the original digital image and the region of interest's relative position within an image generated from the cropping window.

5. The method of claim 3, wherein the cropping window is sized to include an entire size of the region of interest and possesses an aspect ratio that matches an aspect ratio of the original digital image.

6. The method of claim 1, wherein a region of interest is centered in the cropping window.

7. The method of claim 1, wherein
   the importance scores are assigned on a pixel-by-pixel basis within the original digital image as different content elements, and:
   identifying one or more regions of interest within the original digital image; and
   assigning relative importance scores to the identified region(s) of interest.

8. The method of claim 1, wherein the importance scores are assigned to the content elements based on their distance from a vanishing point of the original digital image.

9. The method of claim 1, wherein the importance scores are assigned to the content elements based on assignments of the content elements to one of a foreground content element or a background content element.

10. The method of claim 1, wherein the cropping window is defined to maximize an aggregate importance score of content elements contained in the cropping window and to possess an aspect ratio that matches an aspect ratio of the original digital image.

11. The method of claim 1, wherein the cropping window is defined to maximize a size of the cropping window.

12. An image editing system, comprising a processor and memory, the memory containing instructions, that when executed by the processor, cause at least:
when an occlusion is detected in an original digital image, determining an area occupied by the occlusion;
rotating the original digital image to align a detected horizon to a horizontal axis;
assigning importance scores to different content elements of the rotated digital image,
defining a cropping window around an area of the rotated digital image that does not include the area occupied by the occlusion and that is based on the importance scores; and
cropping the rotated digital image to the cropping window.

13. The system of claim 12, wherein the content elements include at least one region of interest and one non-region of interest and the importance scores are different for portions of image data within the region of interest and portions of image data within the non-region of interest.

14. The system of claim 13, wherein the cropping window is sized to retain proportionality between the region of interest's relative position within the original digital image and the region of interest's relative position within an image generated from the cropping window.

15. The system of claim 13, wherein the cropping window is sized to include an entire size of the region of interest and possesses an aspect ratio that matches an aspect ratio of the original digital image.

16. The system of claim 12, wherein a region of interest is centered in the cropping window.

17. The system of claim 12, wherein
the importance scores are assigned on a pixel-by-pixel basis within the original digital image as different content elements, and:
identifying one or more regions of interest within the original digital image; and
assigning relative importance scores to the identified region(s) of interest.

18. The system of claim 12, wherein the importance scores are assigned to the content elements based on their distance from a vanishing point of the original digital image.

19. A non-transitory computer readable media comprising instructions, that when executed on a processor, cause at least:
when an occlusion is detected in an original digital image, determining an area occupied by the occlusion;
rotating the original digital image to align a detected horizon to a horizontal axis;
assigning importance scores to different content elements of the rotated digital image;
defining a cropping window around an area of the rotated digital image that does not include the area occupied by the occlusion and that is based on the importance scores; and
cropping the rotated digital image to the cropping window.

* * * * *